United States Patent
Teyssier et al.

(10) Patent No.: US 10,523,861 B2
(45) Date of Patent: Dec. 31, 2019

(54) DEFOCUS ESTIMATION METHOD INDEPENDENT OF THE SCENE CONTENT AND USE IN AN AUTOFOCUS SYSTEM

(71) Applicant: STMicroelectronics (Grenoble 2) SAS, Grenoble (FR)

(72) Inventors: Jeremie Teyssier, Grenoble (FR); Francesco Cascio, Grenoble (FR)

(73) Assignee: STMICROELECTRONICS (GRENOBLE 2) SAS, Grenoble (FR)

( * ) Notice: Subject to any disclaimer, the term of this patent is extended or adjusted under 35 U.S.C. 154(b) by 22 days.

(21) Appl. No.: 15/862,946

(22) Filed: Jan. 5, 2018

(65) Prior Publication Data

US 2018/0131863 A1    May 10, 2018

Related U.S. Application Data

(63) Continuation of application No. 14/833,508, filed on Aug. 24, 2015, now Pat. No. 9,906,707.

(30) Foreign Application Priority Data

Dec. 17, 2014    (FR) ...................................... 14 62654

(51) Int. Cl.
| | |
|---|---|
| G03B 13/34 | (2006.01) |
| H04N 5/232 | (2006.01) |
| G06T 5/00 | (2006.01) |
| G06T 5/50 | (2006.01) |
| H04N 5/235 | (2006.01) |

(52) U.S. Cl.
CPC ......... *H04N 5/23212* (2013.01); *G06T 5/003* (2013.01); *G06T 5/50* (2013.01); *H04N 5/2356* (2013.01); *G06T 2207/10148* (2013.01)

(58) Field of Classification Search
CPC .................................. G03B 3/10; G03B 13/34
USPC .......................................... 396/123; 348/354
See application file for complete search history.

(56) References Cited

U.S. PATENT DOCUMENTS

| | | |
|---|---|---|
| 4,608,490 A | 8/1986 | Nagasaki et al. |
| 2012/0076362 A1 | 3/2012 | Kane et al. |
| 2013/0063566 A1 | 3/2013 | Morgan |
| 2013/0308005 A1 | 11/2013 | Takahashi |
| 2013/0329122 A1 | 12/2013 | Geisler et al. |
| 2014/0210999 A1 | 7/2014 | Komatsu |

FOREIGN PATENT DOCUMENTS

EP    1624672 A1    8/2006

OTHER PUBLICATIONS

Torralba, A., et al., "Statistics of Natural Image Categories," Network: Comput. Neural Syst. 14 (May 12, 2003) pp. 391-412.

*Primary Examiner* — Clayton E. LaBalle
*Assistant Examiner* — Fang-Chi Chang
(74) *Attorney, Agent, or Firm* — Slater Matsil, LLP

(57) ABSTRACT

A method of adjusting a lens may include adjusting the lens at a first focus position, and acquiring a first image of a scene through the lens. The method may further include adjusting the lens at a second focus position, and acquiring a second image of the same scene through the lens. In addition, the method may include producing respective power spectra of the first and second images, and producing a criterion representing the ratio of the power spectra to estimate a focus error of the lens.

20 Claims, 3 Drawing Sheets

SCENE * PSF + N = IMAGE
W

↓ FFT

↓ RAVG

Vp1/Vp2

DEFOCUS ESTIMATION METHOD INDEPENDENT OF THE SCENE CONTENT AND USE IN AN AUTOFOCUS SYSTEM

CROSS-REFERENCE TO RELATED APPLICATIONS

This application is a continuation of U.S. patent application Ser. No. 14/833,508, entitled "DEFOCUS ESTIMATION METHOD INDEPENDENT OF THE SCENE CONTENT AND USE IN AN AUTOFOCUS SYSTEM," filed Aug. 24, 2015 which application claims the benefit of French Application No. 1462654, filed on Dec. 17, 2014, which application is hereby incorporated herein by reference.

TECHNICAL FIELD

This disclosure relates to autofocus techniques for camera lenses, and, more particularly, to direct-focus techniques based on criteria for estimating the focus error or defocus of an image.

BACKGROUND

U.S. Patent Application Publication No. 2013/0329122 describes a direct-focus system that estimates, from a spectral signature of a first image captured with an arbitrary focus, the correction to apply to the lens to capture a sharp second image.

The system uses a statistical learning machine configured from numerous samples of spectral signatures produced for a variety of reference scenes placed at different distances from the lens and captured with multiple degrees of defocus.

Such a system may not be efficient for some types of scene.

SUMMARY

A general method is provided herein for adjusting a lens, comprising adjusting the lens at a first focus position; acquiring a first image of a scene through the lens; adjusting the lens at a second focus position; acquiring a second image of the same scene through the lens; producing respective power spectra of the first and second images; and producing a criterion representing the ratio of the power spectra to estimate a focus error of the lens.

The method may comprise storing a set of reference criteria obtained for different focus errors of the lens using a same reference step between the first and second focus positions; applying the reference step between the first and second focus positions of the lens; comparing the produced criterion to the reference criteria; and correcting the focus position of the lens based on the reference criterion closest to the current criterion.

The method may comprise producing the power spectra from Fourier transforms operated in a same window of the first and second images; calculating a radial average of each of the power spectra; and using the ratio of the radial averages of the spectra as the criterion for estimating the focus error.

The method may comprise capturing an image after correcting the focus position of the lens; producing a new criterion and confronting it with the reference criteria; and if the reference criterion closest to the new criterion indicates a focus error, reiterating a focus correction procedure.

The method may comprise storing a second set of reference criteria obtained for different focus errors of the lens using a same second reference step between the first and second focus positions; and selecting a reference step and the corresponding set of reference criteria best adapted to the first and second focus positions.

The set of reference criteria may comprise a single reference criterion for each focus error.

BRIEF DESCRIPTION OF THE DRAWINGS

Other potential advantages and features of various embodiments will become more clearly apparent from the following description of particular embodiments provided for exemplary purposes only and represented in the appended drawings, in which.

DETAILED DESCRIPTION OF ILLUSTRATIVE EMBODIMENTS

Figure 1:
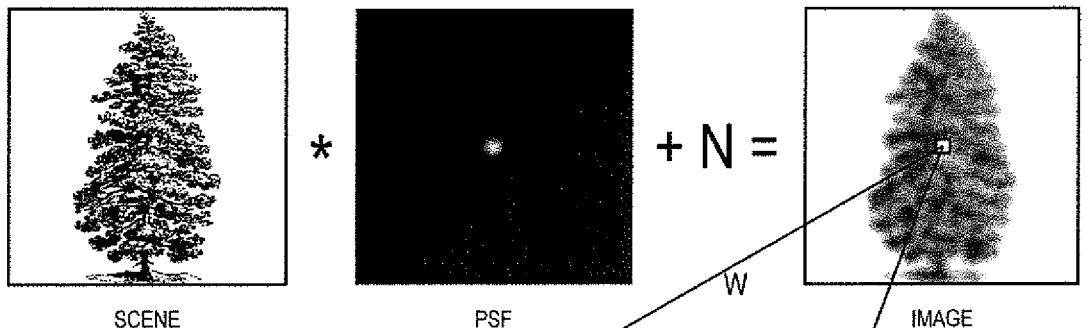
FIG. 1 illustrates spatial functions involved in the formation of an image of a scene through a lens.

FIG. 1 illustrates spatial functions involved in the formation of an image of a scene through a lens. The image is the result of a two-dimensional convolution (*) of the scene by a Point Spread Function PSF, plus noise N. The point spread function is a surface that represents the optical transfer function of the lens with its current focus setting. If the setting is optimal and the lens is ideal, the PSF function boils down to a central peak of amplitude 1. If the setting is not optimal, the PSF function is generally a more or less spread Airy function.

Thus, the optical system may be described by the following equation:

$$\text{IMAGE} = \text{SCENE} * \text{PSF}(x,d) + \text{NOISE}$$

Where x is the focus position of the lens in its adjustment range and d the distance of the scene relative to the lens.

In the frequency domain, for example using a Fourier transform F, the equation becomes:

$$F(\text{IMAGE}) = F(\text{SCENE}) \cdot F(\text{PSF}(x,d)) + F(\text{NOISE}).$$

Fourier transforms are operated on same size windows, which may correspond to the exposed array of pixels of the sensor or to a smaller area of interest. In this case, SCENE may be the sharp image as received by the sensor in the optimal configuration of the lens.

A two-dimensional Fourier transform produces a matrix of complex coefficients representing the amplitude and phase of the frequency components.

The convolution product (*) of two spatial images becomes a simple product, or element-by-element product, denoted by "·", of the first transform by the second in the frequency domain. The resulting matrix is such that each of its coefficients is equal to the product of the coefficients at the same position in the first and second transforms.

The ratio of the equations obtained in the frequency domain for two focus positions of the lens and the same scene, yields:

$$F(IMAGE1)/F(IMAGE2) = (F(SCENE) \cdot F(PSF(x1,d)) + F(x,d) + F(NOISE1))/(F(SCENE) F(PSF(x2,d)) + F(NOISE2))$$

Neglecting noise, the terms F (SCENE) are simplified and disappear in the second member. This yields:

$$F(IMAGE1)/F(IMAGE2) \approx F(PSF(x1,d))/F(PSF(x2,d))$$

Note that the ratio of the two image transforms is independent, neglecting noise, of the content of the scene—it is substantially equal to the ratio of the transforms of the PSF functions that only depend on the configuration of the lens.

A criterion is defined and used hereinafter, which is representative of the ratio of the transforms of two images of the same scene. By "ratio" of the transforms, it is understood that the first transform is filtered by the inverse filter of the second transform. This boils down to dividing each coefficient of the first transform by the coefficient of same position in the second transform, operation that will be designated as "simple ratio". This criterion may be used to objectively quantify the focus error or defocus of an image in an autofocus method.

To thus define the objective defocus criterion, it is not necessary to consider the full content of the transforms. Only the power spectra may be considered, which allows calculation simplifications while preserving the efficiency of the defocus criterion.

FIGS. 2A-2D illustrate processing steps of two images of the same scene to establish an objective defocus criterion. The images differ in the lens focus setting. The image is sharp on the left and blurry on the right.

Figure 2A:
FIGS. 2A to 2D illustrate steps in the generation of a scene-content independent defocus criterion.
Figure 2A:
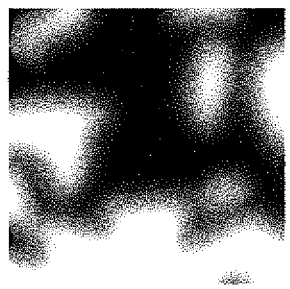

In FIG. 2A, a working window W of the image captured by the sensor is taken for the operations, for example a window of 128×128 pixels in the center of the image or in a selected area of interest.

Figure 2B:
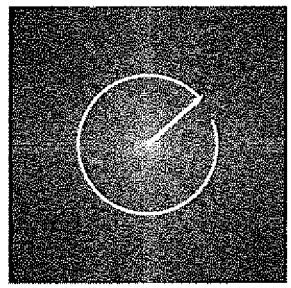
Figure 2B:
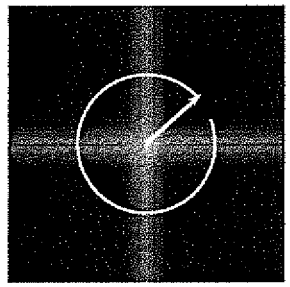

In FIG. 2B, a two-dimensional power spectrum of the window W is calculated, for example through a Fourier transform FFT.

Figure 2C:
Figure 2C:

In FIG. 2C, a radial average of the power spectrum is calculated. The radial average forms a one-dimensional spectral signature of the window and is represented as a vector Vp. This vector may have up to 64 components for a 128×128 pixel window, i.e. half the width of the window.

The direct-focus techniques described in U.S. Patent Application Publication No. 2013/0329122 use a defocus criterion similar to vector Vp. The nature of the vector Vp depends on the frequency content of the scene. Thus the techniques disclosed in the aforementioned patent application find limitations in that different scenes captured under the same focus conditions produce substantially different vectors Vp.

Figure 2D:

In FIG. 2D, a criterion independent of the frequency content of the scene is produced by calculating a ratio between the two vectors Vp1 and Vp2 produced in the previous step. Calculating this "ratio" may be construed in fact as filtering the vector Vp1 by the inverse filter of vector Vp2. The ratio is thus a vector V in which each component is the ratio of the components of same position in vectors Vp1 and Vp2.

The essence of an image usually being represented by the first frequencies of the spectrum, it suffices to keep a few components in the vectors, for example only half of them (32). This also removes higher frequency components primarily due to noise.

Figure 3A:
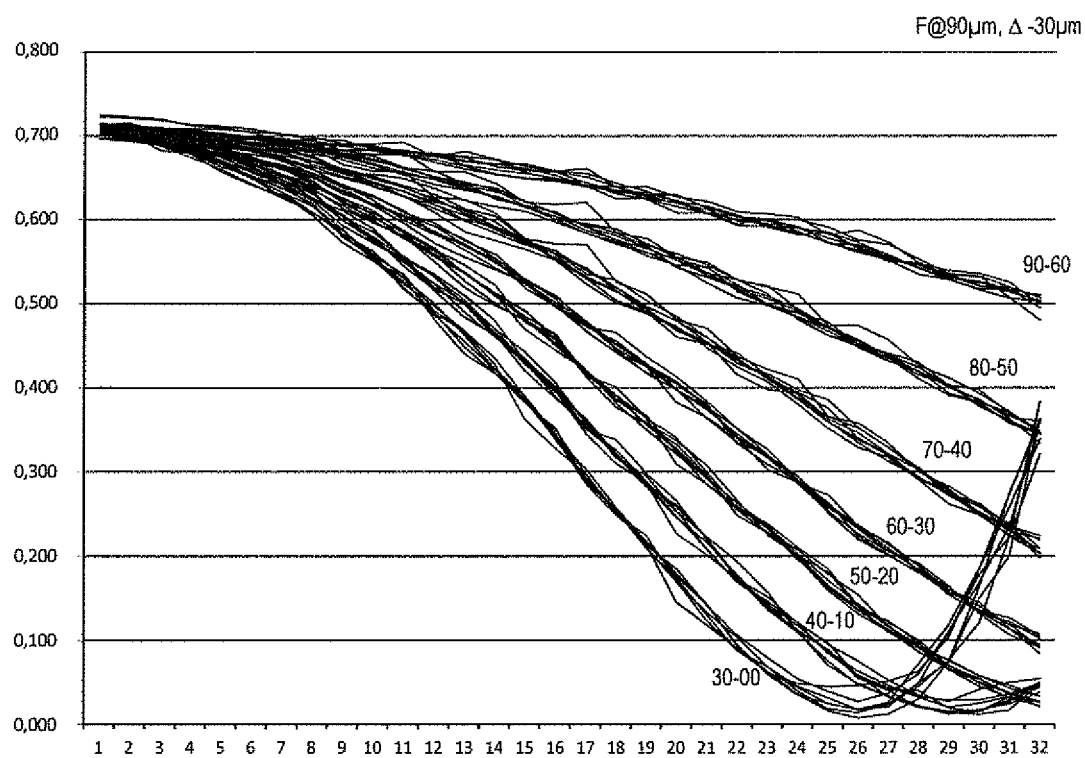
FIGS. 3A and 3B show, for each of two distances of a scene from the lens, a series of defocus criteria of the type of FIG. 2D measured for several types of scene and several focus positions of the lens.
Figure 3B:
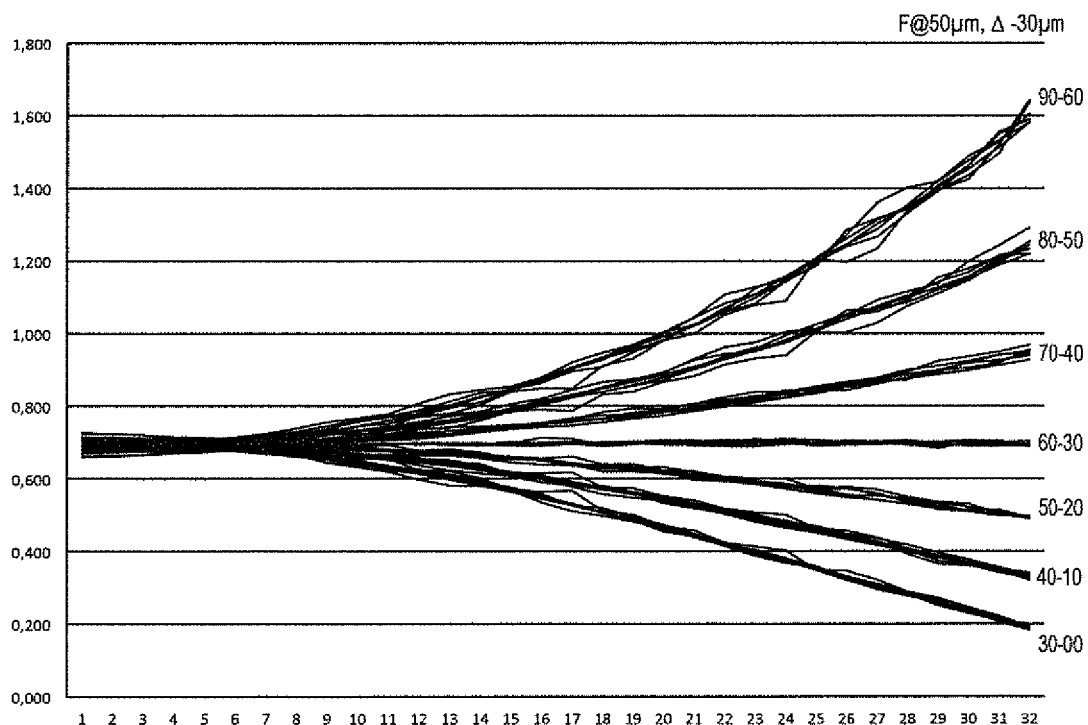

FIGS. 3A and 3B demonstrate the objectivity of the criterion V, that is to say, its independence from the captured scene. They represent, in the form of curves, the components of vectors V obtained by tests achieved on ten reference scenes of different types.

The scenes were captured with a lens having a focal length of 2.94 mm and a focus adjustment range of 90 microns. The position of the lens may vary from 0 to 90 microns in 0-micron steps, position 0 corresponding to the infinity focus position.

The working window has a size of 128×128 pixels and the vectors V have 32 components identified by their ranks on the x-axis. Thus the criterion V does not take into account the higher half of the spectral components present in the window.

All the criteria or vectors V were produced using the same reference step $\Delta$ of −30 microns between the positions of the lens, meaning that the second image for the test was captured by moving the lens 30 microns toward 0 from the position used to capture the first image. The vectors are identified by the notation X-Y, where X and Y are the pair of lens positions used to capture the first and second images used for the criterion. The ratio used to produce the criteria V is that of the second image over the first.

In FIG. 3A, the different reference scenes were placed at 99 mm from the lens. The in-focus position of the lens under these conditions, denoted F@ on the graphs, is 90 microns. In the lens adjustment range, using a step $\Delta$ of 30 microns, seven starting positions are possible, from 30 to 90 microns in 10-micron steps. The vectors obtained are identified by 30-00 to 90-60.

It may be observed that a narrow bundle of vectors corresponds to each pair of focus positions, in fact the vectors produced by the different scenes. In addition, the bundles associated with different pairs of positions are clearly distinguishable, which facilitates the use of the criterion V in the applications envisaged hereafter.

In the absence of noise and in theory, according to the equations, all vectors of a single bundle would coincide. The differences actually measured between the vectors of a same bundle are due to noise, including noise from the image sensor and noise introduced by the approximations made in the calculations. When the signal-to-noise ratio decreases, which occurs under low-light conditions, greater dispersion will be noted between the vectors of the same bundle. However, it will always be possible to find in the scene a brighter portion to place the working window W, and thus increase the signal-to-noise ratio.

In FIG. 3B, the different reference scenes were placed at 175 mm from the lens. The in-focus position F@ of the lens under these conditions is 50 microns. Again seven starting positions are available, and the obtained vectors are identified by 30-00 to 90-60.

It may be noted again that a narrow bundle of vectors corresponds to each pair of focus positions, and the bundles are clearly distinguishable.

Similar results are obtained for the other in-focus positions of the lens.

It may also be noted that the curves are monotonous in general, except for the bundles 30-00 and 40-10 of FIG. 3A. These bundles actually correspond to the two farthest positions from the in-focus position. If the values of the components beyond 32 of the vectors V are taken into account, that is to say, taking a larger radius for the radial average, it can be noted that the curves change trends, as for curves 30-00 and 40-10 of FIG. 3A. It can also be noted that the dispersion of the vectors of a same bundle is higher beyond component 32, so that it becomes difficult to distinguish the bundles.

Thus, in an analysis algorithm using these vectors V, the components of the vector V may be limited to a range where the bundles are narrower and distinguishable, or less weight may be given to the components beyond the range.

Figure 4A:
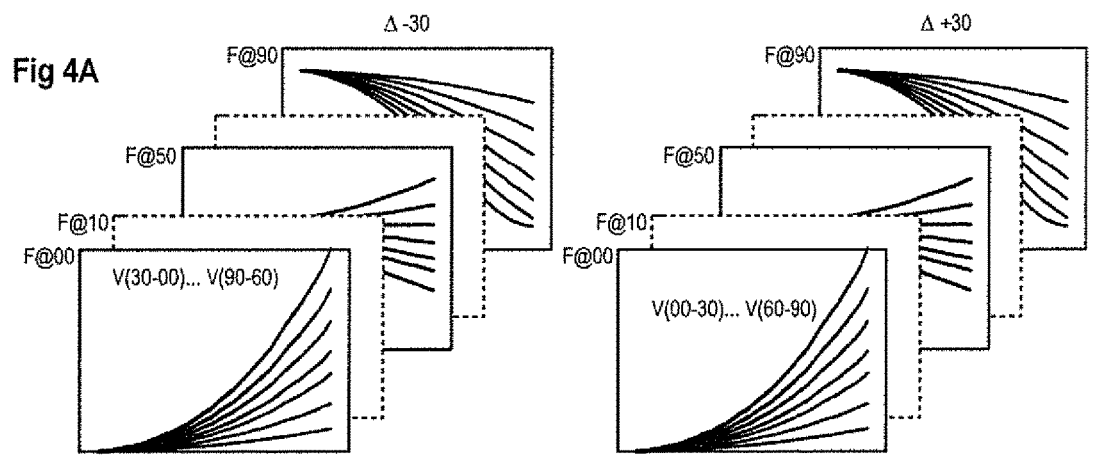
FIG. 4A illustrates two sets of reference criteria as produced in an exemplary configuration phase.
Figure 4B:
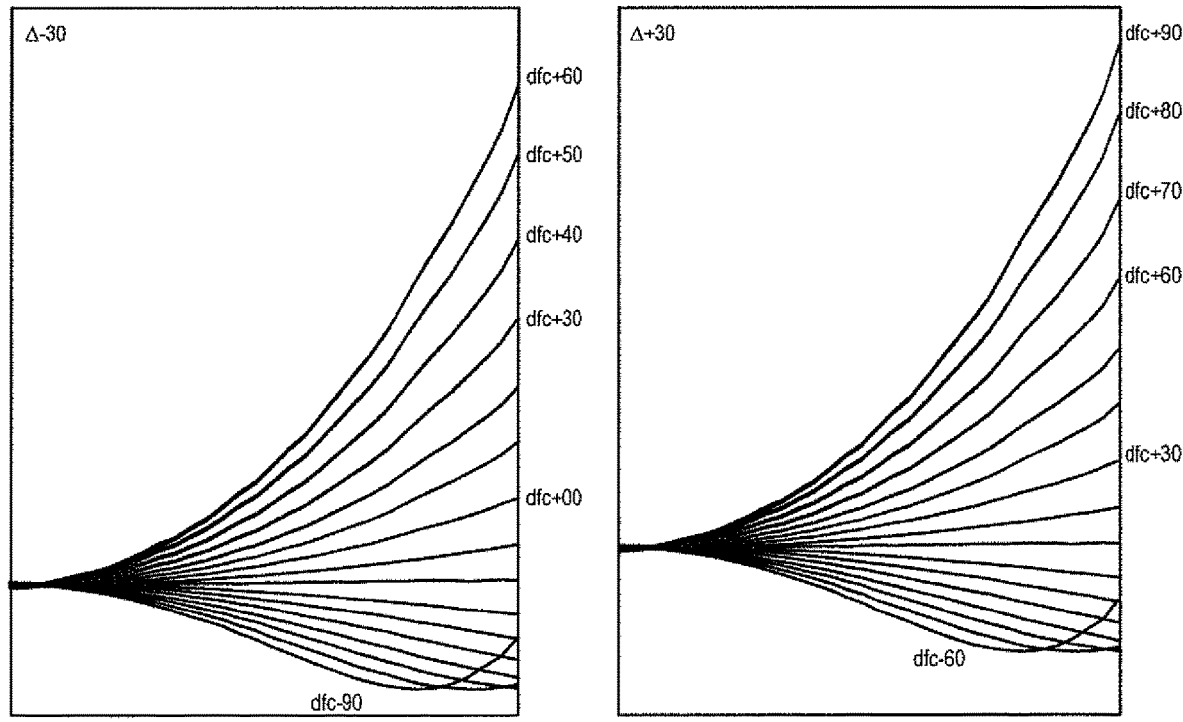
FIG. 4B illustrates another representation of the sets of criteria of FIG. 4A, as used by an autofocus system.

FIGS. 4A and 4B illustrate a practical application of these explorations to estimate the defocus of a lens, for example in an autofocus system.

In FIG. 4A, for a reference step Δ and for each possible in-focus lens position, a set of vectors or reference curves may be constructed. Each set is designated by the corresponding in-focus position F@, and each curve in the set is designated V(X–Y), where X and Y are the first and second focus positions used. The offset between the X and Y positions is constant and equal to the reference step Δ. FIG. 4A shows in fact two exemplary series of reference curves, one for a –30 microns step, and the other for a +30 microns step.

Each set of reference curves is thus similar to the set of curves of FIG. 3A or 3B, wherein each bundle is replaced by a reference curve representing an average of the curves of the bundle. The reference curve may be stored with the standard deviation observed in the averaging, standard deviation that may be used subsequently in techniques for comparing a measured curve to reference curves.

If the system can always use the same starting position for the lens at the time of taking a picture, only the curves corresponding to the selected starting position are useful, whereby the system may store only one of the curves of each of the sets, for example the median curves assigned to the starting position 60.

Then, for taking the picture, the system may place the lens in the selected starting position, acquire the first image in the working window, shift the lens by step Δ, acquire the second image in the same window, calculate the criterion V, and confront the criterion to the stored reference curves. The "closest" reference curve then provides, via the set it belongs to, the in-focus position F@ to use for capturing the final image.

When the system has no control over the starting position, for example, while filming video where focusing is performed continuously, it is useful to have reference curves for all the possible starting positions. Then the system directly acquires the first image at the current position of the lens, shifts the lens by the reference step for acquiring the second image, and confronts the measured criterion to the reference curves corresponding to the used starting position in the different sets.

Given the choice of step Δ, the starting positions associated with the reference curves are limited in a range truncated by the step, for example, between 30 and 90 microns for a step of –30 microns—the range between 0 and 20 microns is missing to complete the full range of lens adjustment possibilities.

To cover this missing range, as shown to the right of FIG. 4A, a second series of reference curve sets may be constructed, based on a different reference step chosen so that the missing starting positions are covered. For example, a step Δ of +30 microns may be chosen, offering a range of reference curves corresponding to starting positions from 0 to 60 microns.

Then, in operation, if the current position of the lens is not in the range covered by the series associated with step –30 microns, the system may apply a step of +30 microns and switch to the corresponding series of curves to find the ones that match the current position.

When the final image is captured, the defocus criterion may again be calculated for confronting it to the reference curves. Normally the found curve should confirm that the lens position is correct, that is to say indicate a zero correction. Should this not be the case, the image may have too much noise or have moved—the current image may then serve as a first image in a new attempt to focus.

The position correction operated to capture the final image is unpredictable, whereby the end position cannot be used in practice as a new second position to calculate the new criterion, unless the correction happens to be equal to a reference step Δ. Otherwise the final position does not allow calculating a new criterion immediately, but it can serve as a first image to initiate the production of a new criterion. In other applications, additional sets of curves may be stored to cover a variety of reference steps. Then a new criterion may be calculated as soon as the final image is captured.

A method has been described in connection with FIG. 4A based on an exhaustive database of reference curves that can be used in all circumstances. In many applications where the lens has a simple configuration, such as in the cases considered herein, an approximation may be used that makes many curves redundant.

Indeed, reverting to FIGS. 3A and 3B, it can be noted that the bundles 70-40 to 90-60 of FIG. 3A are substantially the same as the bundles 30-00 to 50-20 in FIG. 3B.

This can be explained by the fact that the ratios calculated for the criteria V also correspond to the ratios of the spectra of point spread functions (PSF), and that these PSF functions depend, as an approximation, on the relative position of the lens with respect to the in-focus position, regardless of the distance of the scene. In other words, if x is the absolute position of the lens and xd the in-focus position for the current distance d of the scene, noting the relative position dfc=x–xd, the following can be written:

$$PSF(x,d)=PSF(xd+dfc,d)$$

$$\approx PSF(xd1+dfc,d1) \approx PSF(xd2+dfc,d2) \ldots$$

$$\approx PSF(dfc,\infty), \text{ since } xd=0 \text{ for an infinite distance } d.$$

The notation PSF{dfc} is used hereafter to express the PSF function independent of the distance d associated with the relative position dfc.

Thus, for example, vectors 80-50 of FIG. 3A, where the in-focus position is 90 microns, are expressed by:

$$F(PSF\{80\text{-}90\})/F(PSF\{50\text{-}90\})=F(PSF\{-10\})/F(PSF\{-40\})$$

The vectors 40-10 of FIG. 3B, where the in-focus position is 50 microns, are expressed by:

$$F(PSF\{40\text{-}50\})/F(PSF\{10\text{-}50\})=F(PSF\{-10\})/F(PSF\{-40\})$$

The vectors 80-50 of FIG. 3A thus belong to the same bundle as the vectors 40-10 of FIG. 3B.

Returning to FIG. 4A, each reference curve may then characterize the offset of the second position relative to the in-focus position, in other words the defocus distance, regardless of the in-focus position. With this definition, a same reference curve, or defocus curve may be present in several sets of FIG. 4A, while only one version is actually useful. Each defocus curve is denoted hereinafter dfcX, where X is the signed offset of the second measure position relative to the in-focus position of F@.

With a step Δ of −30 microns used for the first series of curves of FIG. 4A, unique defocus curves may be chosen in several ways among the sets F@00 to F@90, since these curves may be present in multiple sets. For example:

dfc−90 to dfc−30 corresponding to the curves V(30-00) to V(90-60) of the set F@90, dfc−20 to dfc−10 corresponding to the curves V(60-30) to V(70-40) of the set F@50, and dfc−00 to dfc+60 corresponding to the curves V(30-00) to V(90-60) of the set F@00.

The defocus curves dfc+70 to dfc+90 are missing, which assume that the second measurement position can be 70, 80 or 90 and the first position 0, 10 or 30, positions that are not covered in the series of curves associated with the step Δ=−30 microns.

To cover these positions, the series of curves associated with step Δ=+30 microns may be used. This series provides a selection of defocus curves dfc−60 to dfc+90.

Thus, when the lens is located between positions 30 and 60, the system may decide to use any of the steps −30 or +30 to capture the second image. When the lens is located between positions 0 and 20, the system may choose step +30. Finally, when the lens is located between positions 70 and 90, the system may choose step −30.

FIG. 4B illustrates two schematic sets of defocus curves resulting from these refinements, associated with steps Δ of −30 microns and 30 microns respectively. Each set includes sixteen defocus curves, dfc−90 to dfc+60 for step −30, and dfc−60 to dfc+90 for step +30. The curves have been shown as similar in both sets, but this is generally not the case in practice.

Different scatter plot classification techniques may be used to confront the measured criterion to the stored defocus curves, the purpose being to identify the stored curve that best fits the measured curve or criterion. Available techniques are, for example, least squares, support vector machines (SVM), linear discriminant analysis (LDA).

Given the nature of the curves here, the LDA analysis may be preferred. One of the steps of this technique is to find a new coordinate system in which the scatter plots can be better discriminated. In this case, to reduce computing resources, each reference curve may be stored in the new coordinate system rather than letting the system perform this calculation at each comparison.

Many variations and modifications of the embodiments described herein will be apparent to the skilled person. The values indicated for the reference steps Δ are purely exemplary. The values of the reference steps and the number of defocus curve sets may be adapted by the skilled person to the particular system in which they are to be implemented. The defocus criterion was described as a ratio of radial averages of power spectra, but other calculation methods may be used to provide a criterion representative of power spectra ratios.

The reference curves were described as produced experimentally from reference images—they may also be produced from the PSF functions provided by the lens manufacturer, or from measured PSF functions. The various autofocus steps described herein may be performed by a processor having a memory associated therewith.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of defocus estimation, the method comprising:

adjusting a lens to a first focus position;

acquiring a first image of a scene through the lens at the first focus position;

adjusting the lens to a second focus position different from the first focus position;

acquiring a second image of the scene through the lens at the second focus position;

generating a first power spectrum of a first spatial portion of the first image, the first spatial portion being smaller in size than the first image;

determining a radial average of the first power spectrum, the radial average of the first power spectrum being a first vector having a first number of components;

generating a second power spectrum of a second spatial portion of the second image, the second spatial portion being smaller in size than the second image;

determining a radial average of the second power spectrum, the radial average of the second power spectrum being a second vector having the first number of components;

discarding a terminal portion of the first vector to generate a truncated radial average of the first power spectrum having a second number of components;

discarding a terminal portion of the second vector to generate a truncated radial average of the second power spectrum having the second number of components; and determining a component-wise ratio of the truncated radial average of the first power spectrum and the truncated radial average of the second power spectrum as a criterion for estimating a focus error of the lens, the component-wise ratio being a vector having the second number of components.

2. The method of claim 1, wherein the scene is located at a first distance from the lens when the first image and the second image are acquired.

3. The method of claim 1, wherein the first focus position comprises an in-focus position of the lens, and wherein the second focus position comprises an out-of-focus position of the lens.

4. The method of claim 1, wherein the second number of components is half the first number of components.

5. The method of claim 1, wherein the first spatial portion and the second spatial portion coincide in location relative to the first image and the second image, respectively.

6. The method of claim 1, further comprising:

storing a set of reference criteria obtained for different focus errors of the lens using a same reference step between the first focus position and the second focus position.

7. The method of claim 6, further comprising:

comparing a current criterion, obtained based on the component-wise ratio, to the set of reference criteria;

determining a reference criterion of the set of reference criteria that is closest to the current criterion; and correcting a focus position of the lens based on the reference criterion.

8. The method of claim 7, wherein determining a reference criterion of the set of reference criteria that is closest to the current criterion comprises determining the reference criterion based on a linear discriminant analysis.

9. The method of claim 7, further comprising:

capturing a further image of the scene after correcting the focus position of the lens;

producing a new criterion for estimating the focus error of the lens and comparing it with the set of reference criteria; and reiterating a focus correction procedure in response to the reference criterion closest to the new criterion indicating a further focus error.

10. A method of operating an autofocus device to adjust a lens, the method comprising:
    adjusting the lens to an in-focus position of the lens and at a first distance from a scene;
    acquiring a first image of the scene through the lens at the in-focus position;
    adjusting the lens to an out-of-focus position of the lens and at the first distance from the scene;
    acquiring a second image of the scene through the lens at the out-of-focus position;
    selecting a first spatial portion of the first image, the first spatial portion being smaller in extent than the first image;
    selecting a second spatial portion of the second image, the second spatial portion being smaller in extent than the second image;
    generating a first power spectrum and a second power spectrum of the first spatial portion and the second spatial portion, respectively;
    determining a first radial average and a second radial average of the first power spectrum and the second power spectrum, respectively, each of the first power spectrum and the second power spectrum being a vector quantity having a first number of components, the first number of components being less than a number of pixels along a width of the first image;
    retaining low-frequency components of the first radial average of the first power spectrum and the second radial average of the second power spectrum to generate a truncated first radial average of the first power spectrum and a truncated second radial average of the second power spectrum; and
    determining a component-by-component ratio of the truncated first radial average of the first power spectrum to the truncated second radial average of the second power spectrum as a criterion for estimating a focus error of the lens, the component-by-component ratio being a vector quantity.

11. The method of claim 10, wherein each of the truncated first radial average of the first power spectrum and the truncated second radial average of the second power spectrum comprises a second number of components less than the first number of components.

12. The method of claim 11, wherein the second number of components is equal to one quarter of the number of pixels along the width of the first image.

13. The method of claim 10, further comprising:
    storing a set of reference criteria obtained for different focus errors of the lens using a same reference step between the in-focus position and the out-of-focus position.

14. The method of claim 13, further comprising:
    comparing a current criterion, obtained based on the component-by-component ratio, to the set of reference criteria;
    determining a reference criterion of the set of reference criteria that is closest to the current criterion; and
    correcting a focus position of the lens based on the reference criterion.

15. The method of claim 14, wherein determining a reference criterion of the set of reference criteria that is closest to the current criterion comprises determining the reference criterion based on a linear discriminant analysis.

16. The method of claim 13, wherein the set of reference criteria comprises a single reference criterion for each focus error.

17. The method of claim 10, wherein the first spatial portion and the second spatial portion coincide in location relative to the first image and the second image, respectively.

18. An autofocus device, comprising:
    a lens configured to be adjustable to a plurality of focus positions;
    a memory configured to store a set of reference criteria obtained for different focus errors of the lens using a same reference step between a first focus position and a second focus position; and
    a processor coupled to the memory and the lens, the processor configured to:
        adjust the lens to the first focus position and at a first distance from a scene;
        acquire a first image of the scene through the lens at the first focus position;
        adjust the lens to the second focus position and at the first distance from the scene;
        acquire a second image of the scene through the lens at the second focus position;
        select a first spatial portion of the first image, the first spatial portion being smaller in extent than the first image;
        select a second spatial portion of the second image, the second spatial portion being smaller in extent than the second image;
        generate a first power spectrum and a second power spectrum of the first spatial portion and the second spatial portion, respectively;
        determine a first radial average and a second radial average of the first power spectrum and the second power spectrum, respectively, each of the first power spectrum and the second power spectrum being a vector quantity having a first number of components, the first number of components being less than a number of pixels along a width of the first image;
        retain low-frequency components of the first radial average of the first power spectrum and the second radial average of the second power spectrum to generate a truncated first radial average of the first power spectrum and a truncated second radial average of the second power spectrum; and
        determine a component-by-component ratio of the truncated first radial average of the first power spectrum to the truncated second radial average of the second power spectrum as a criterion for estimating a focus error of the lens, the component-by-component ratio being a vector quantity.

19. The autofocus device of claim 18, wherein the processor is further configured to:
    compare a current criterion, obtained based on the component-by-component ratio, to the set of reference criteria;
    determine a reference criterion of the set of reference criteria that is closest to the current criterion; and
    correct a focus position of the lens based on the reference criterion.

20. The autofocus device of claim 19, wherein the processor is configured to determine the reference criterion of the set of reference criteria that is closest to the current criterion based on a linear discriminant analysis.

\* \* \* \* \*